Nov. 17, 1953    W. R. COMBER    2,659,523
PROTECTIVE BIB FOR VEHICLES
Filed Feb. 3, 1949
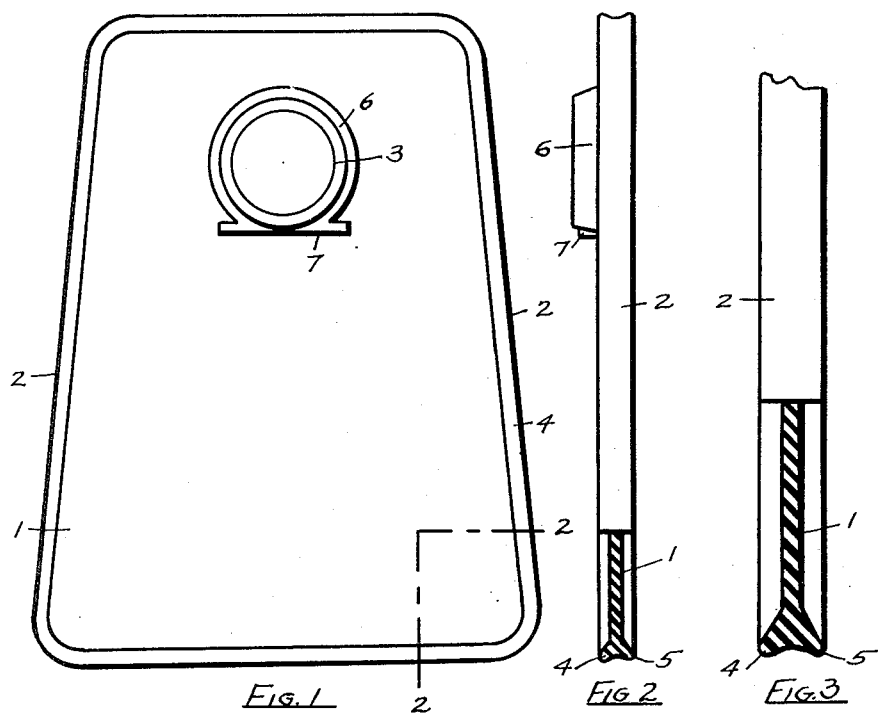
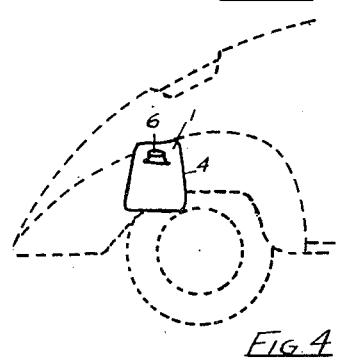
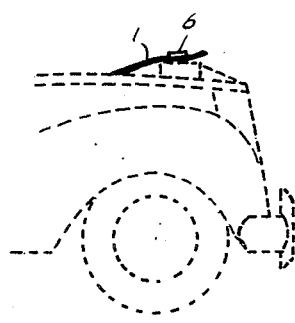
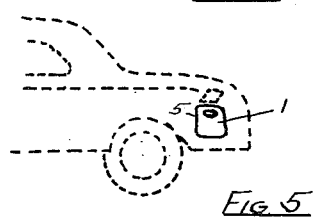
INVENTOR
WILLIAM R. COMBER
BY
Florian G. Miller
ATTORNEY Patented Nov. 17, 1953

2,659,523

UNITED STATES PATENT OFFICE 2,659,523

PROTECTIVE BIB FOR VEHICLES

William R. Comber, Erie, Pa.

Application February 3, 1949, Serial No. 74,340

3 Claims. (Cl. 226—129)

This invention relates generally to a protective shield or bib for disposal over the exterior of a power motor vehicle adjacent the filling pipe leading to the gasoline tank, or on the radiator filling pipe for preventing gasoline, anti-freeze solutions, or other corroding fluids from affecting the paint work or surface finish thereof.

It is a common occurrence for gasoline or other fluids to drip or splatter onto the paint work or surface finish of an automobile or other vehicle during the servicing thereof thereby damaging the finish of the vehicle and ultimately causing deterioration of the base material. Gasoline left on the body of a vehicle also presents a fire hazard.

It is, accordingly, an object of my invention to provide a protective shield or bib which permits the filling of the gasoline tank or radiator of a vehicle without damage to the body surfaces or finishes thereof which is simple in construction, economical in cost, economical in manufacture, efficient in operation, and easy to place in position on the vehicle.

Another object of my invention is to provide a protective bib for disposal over the end of servicing pipes of a vehicle to prevent the dripping and splattering of gasoline or other fluids from damaging the paint work or surface finish or corroding the steel forming the body of the vehicle.

Another object of my invention is to provide a protective bib for an automobile or related vehicle having novel means for holding the bib in place.

Other objects of my invention will become evident from the following detailed description, taken in conjunction with the accompanying drawings, in which Fig. 1 is a plan view of one side of my novel protective bib for a vehicle;

Fig. 2 is a side elevational view of the bib shown in Fig. 1 with a part thereof cut away on the line 2—2 of Fig. 1;

Fig. 3 is a fragmentary enlarged view of the bottom portion of the side elevational view shown in Fig. 2 with the lower part thereof cut away on the line 2—2 of Fig. 1;

Fig. 4 is an illustrative view showing my novel bib with the flange thereof extending upwardly disposed on the fender of a vehicle over the gasoline tank filling pipe;

Fig. 5 is a side elevational view of my novel protective bib with the flange lip thereon extending or depending in a recess in the rear fender of a vehicle leading to the gas tank filling pipe; and Fig. 6 is an illustrative view showing my novel protective bib in a position in alignment with the radiator filling spout in the forward part of a vehicle.

Referring now to the drawings, I show in Figs. 1, 2, and 3 inclusive a flat, flexible member 1, preferably made of a rubber or synthetic rubber composition, having the sides 2 thereof tapered and having an aperture 3 formed centrally and near one end thereof. Marginal, oppositely extending, raised beads 4 and 5 are disposed around the edge of the member 1 to prevent the dripping of fluid onto the protected surfaces of a vehicle or to retain a predetermined amount of fluid therein when it is in a flat or substantiallly flat position. The aperture 3 has an outwardly extending tapered flange 6 surrounding it which provides an extended closed passage from the open end of a filling pipe when the upper end of the filling pipe is disposed below the surface of the outer body of the vehicle thereby preventing gasoline or any other fluid from escaping underneath the member 1. A lip 7 tangentially disposed with relation to the periphery of the aperture 3 is formed adjacent the outer periphery of the flange 6 to engage, when the flange 6 extends downwardly, the edge of a rectangular opening to hold the bib in position on the outer contour of a vehicle such as on the rear fender of an automobile as shown in Fig. 5.

In utilizing my novel protective bib for a vehicle, either side of the bib may be used in that the raised non-drip beads 4 and 5 are disposed on the marginal edges of both sides of the member 1. In the event that a vehicle fender or rear tank is of such contour that the bib 1 will lie thereon as shown in Fig. 4, the aperture 3 is fitted over the filling pipe leading to the gasoline tank with the flange 6 extending upwardly therefrom. Any drippings from the gas pump nozzle upon insertion or removal will be caught by the bib 1 thereby preventing any corrosive action on the surface finish or metal forming part of the body of the vehicle.

Where a rectangular opening is provided in the body of the vehicle as shown in Fig. 5 to reach the filling pipe, the flange 6 is disposed downwardly in the opening toward the upper end of the filling pipe leading to the gas tank and the lip 7 normally engages the edge of the opening to hold it in position. My bib may also be utilized for disposal over the filling spout of a radiator of a vehicle as shown in Fig. 6 wherein the bib is laid on the top of the vehicle with the aperture 3 in alignment with the open end of the filling spout of the radiator. Although my novel protective bib has been described for use on a powered vehicle, it will be evident that it may be used in any situation where the surface finish is to be protected around a filling spout.

It will be evident from the foregoing description that I have provided a novel protective bib for the protection of the surface finish of a vehicle while gasoline, anti-freeze solutions, and other fluids are being passed therein which has a raised double beaded edge so that it may be used on both sides, which has a flange extending outwardly from one side thereof for engaging the open end of a filling pipe, and which has a lip for holding the bib in position with respect to a recessed filling point on a veihcle.

Various changes may be made in the specific embodiment of my invention without departing from the spirit thereof or from the scope of the appended claims.

What I claim is:

1. A combined protective bib and tubular extension for disposal over the open end of a filling pipe of a vehicle comprising a comparatively flat member having an aperture in one end thereof, a marginal bead surrounding said comparatively flat member defining oppositely extending beads on the margin of opposite sides of said member, and a laterally outwardly extending, tapered tubular extension surrounding said aperture for connecting said bib to the mouth of a filling pipe in a well in a vehicle body, said combined protective bib and pipe extension having one side adapted for disposal on an open filling pipe on substantially a level with the surface of a vehicle body and the opposite side with a tubular extension adapted to extend from the open end of a filling pipe to a position above the level of the surface of the surrounding vehicle body.

2. A combined protective bib and tubular extension as set forth in claim 1 wherein a lip tangentially disposed with relation to the periphery of said tubular extension is disposed on the side of said extension to engage the side of a well in a vehicle body to hold the tubular extension in a position extended from a filling pipe.

3. A combined protective bib and tubular extension as set forth in claim 1 wherein said oppositely extending beads surrounding said member comprise a V-shaped marginal bead defining tapered oppositely extending beads.

WILLIAM R. COMBER.

References Cited in the file of this patent

UNITED STATES PATENTS

| Number | Name | Date |
|---|---|---|
| 581,977 | Clingman | May 4, 1897 |
| 1,733,261 | Higby et al. | Oct. 29, 1929 |
| 2,111,031 | Newton | Mar. 15, 1938 |
| 2,389,672 | Lippold | Nov. 27, 1945 |
| 2,538,813 | Wagner | Jan. 23, 1951 |

FOREIGN PATENTS

| Number | Country | Date |
|---|---|---|
| 297,631 | Great Britain | Sept. 27, 1928 |